US012791442B2

(12) United States Patent
Desmet

(10) Patent No.: US 12,791,442 B2
(45) Date of Patent: Nov. 10, 2026

(54) DEVICE FOR APPLYING VIBRATIONS TO A PASSENGER CAR

(71) Applicant: BEP Europe NV, Bruges (BE)

(72) Inventor: Yves Jeroom André Desmet, Assebroek (BE)

(73) Assignee: BEP EUROPE NV, Bruges (BE)

( * ) Notice: Subject to any disclaimer, the term of this patent is extended or adjusted under 35 U.S.C. 154(b) by 271 days.

(21) Appl. No.: 18/691,198

(22) PCT Filed: Sep. 16, 2022

(86) PCT No.: PCT/IB2022/058768
§ 371 (c)(1),
(2) Date: Mar. 12, 2024

(87) PCT Pub. No.: WO2023/042144
PCT Pub. Date: Mar. 23, 2023

(65) Prior Publication Data

US 2024/0402051 A1 Dec. 5, 2024

(30) Foreign Application Priority Data

Sep. 17, 2021 (BE) .................................. 2021/5736

(51) Int. Cl.
*G01M 17/007* (2006.01)
*G01L 5/28* (2006.01)
*G01M 7/04* (2006.01)

(52) U.S. Cl.
CPC ......... *G01M 17/0074* (2013.01); *G01L 5/282* (2013.01); *G01M 7/04* (2013.01)

(58) Field of Classification Search
CPC ........................... G01M 17/0074; G01L 5/282
See application file for complete search history.

(56) References Cited

U.S. PATENT DOCUMENTS 5,289,718 A * 3/1994 Mousseau ............. G01M 17/02 73/146
7,584,654 B2 * 9/2009 Seibl ....................... G01L 5/288 73/123

(Continued)

FOREIGN PATENT DOCUMENTS

| | | | |
|---|---|---|---|
| DE | 202006011246 | | 10/2006 |
| KR | 20110057212 | * | 5/2011 |
| WO | 2021/140458 | | 7/2021 |

OTHER PUBLICATIONS

International Search Report and Written Opinion in International Application No. PCT/IB2022/058768, mailed on Dec. 9, 2022, 15 pages.

*Primary Examiner* — John E Breene
*Assistant Examiner* — Alex T Devito
(74) *Attorney, Agent, or Firm* — KDW Firm PLLC

(57) ABSTRACT

A device for testing a brake system and at least one driving assistance system of a vehicle, which device has a platform on which the vehicle is placeable, where the platform is provided with a plurality of sets of rollers and where a respective wheel of the vehicle is positionable on each respective set of rollers. The plurality of sets of rollers are driveable by a respective drive with a measuring device which is configured to measure a force exerted on the roller for the purpose of performing the test of the brake system on the vehicle. The device includes, at the position of each pair of rollers, an aligning means configured to position the vehicle at a predetermined location on the rollers so that the at least one driving assistance system can be tested.

13 Claims, 1 Drawing Sheet

(56) References Cited

U.S. PATENT DOCUMENTS

| | | | | |
|---|---|---|---|---|
| 2004/0050150 | A1* | 3/2004 | Jahn .................. | G01M 17/0074<br>73/146 |
| 2008/0215207 | A1 | 9/2008 | Heinze | |

* cited by examiner

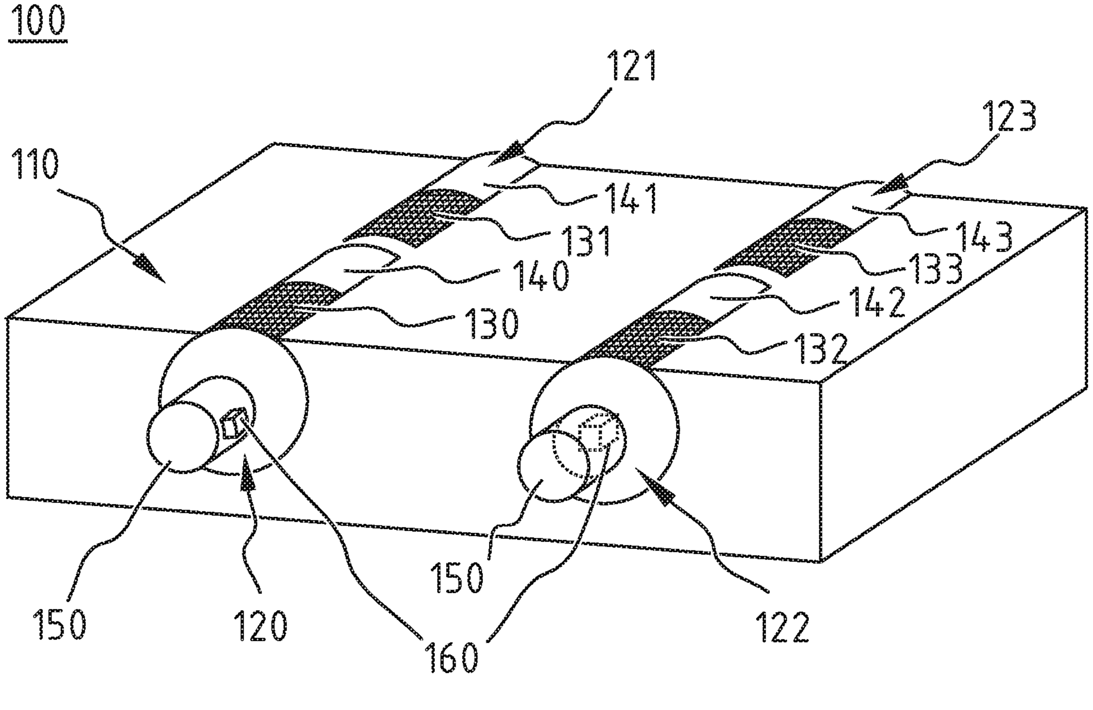
100
121
123
110
141
143
131
133
140
142
130
132
150
150
120
160
122

DEVICE FOR APPLYING VIBRATIONS TO A PASSENGER CAR

This application is a national stage filing under 35 U.S.C. 371 of pending International Application No. PCT/IB2022/0058768, filed Sep. 16, 2022, which claims priority to Belgian patent application 2021/5736, filed Sep. 17, 2021, the entirety of which applications are incorporated by reference herein.

The invention relates to a device for applying vibrations to passenger cars.

More than ever, road safety is a pressing societal issue. In order to increase the safety of passenger cars as well as road safety many developments have been realized in recent times in respect of the number and type of driver-assistance systems and vehicle control systems. Such driver-assistance systems and vehicle control systems are typically tested at the end of a production line.

When testing passenger cars, these cars are tested for vibration. More specifically, the passenger cars are placed on a device, wherein the passenger cars are located with at least two wheels, the front wheels and/or the rear wheels, on rollers. The rollers have a relief in order to generate a predetermined vibration when they turn under the wheels.

The device for applying vibrations is sub-optimal.

It is an object of the invention to provide an improved device for applying vibrations.

The invention provides for this purpose a device for applying vibrations to a passenger car and for testing a brake system of the passenger car, which device has a platform on which the passenger car is placeable, wherein the platform is provided with a plurality of rollers wherein a respective wheel of the passenger car is positionable on each respective roller, wherein the plurality of rollers are respectively driven by a drive with a measuring device configured to measure the force exerted on the roller, wherein each roller has for each wheel positioned thereon a first zone provided with relief and a second, relief-free zone, so that in a first position on the device the passenger car is located with the wheels on the first zones and in a second position on the device is located with the wheels on the second zones, and so that in the first position vibrations are applied to the passenger car by the relief of the roller by rotation of the rollers under the wheels and so that in the second position the brake system of the passenger cars can be tested by measuring a force exerted by the brake system with the measuring device.

A device for applying vibrations is the better known in practice as a so-called rattle machine. When testing passenger cars, these cars are tested for vibration. More specifically, the cars are placed on the rattle machine, wherein the passenger cars are located with at least two wheels, the front wheels and/or the rear wheels, on rollers. The rollers have a relief in order to generate a predetermined vibration when they turn under the wheels. A relief can for instance be created to imitate a predetermined ground surface, such as cobblestones. When the passenger car is placed with its wheels on the rollers, and the wheels and rollers rotate, a vibration is applied to the car by the relief. This vibration corresponds with a vibration of the passenger car when travelling along the predetermined ground surface.

The invention is based on the insight that the rollers of the device have on one hand a first zone provided with a relief. In this way the device can apply vibrations to the passenger car and perform the above stated rattle machine function when the passenger car is located on the device in the first position. On the other hand, the device also allows testing of the passenger car, when it is located on the device in the second position, without vibrations in that the rollers are provided with a second zone which has no relief. This allows the testing of the brake system, which is performed on a roller brake device in known production lines, to be performed on the device. In this way functionalities of the roller brake device are at least partially integrated in the device for applying vibrations. This has multiple advantages. Only one device need thus be provided instead of two different devices. Furthermore, the device takes up less space on the production floor and the device requires less intensive maintenance. A user need further purchase only one device. For this purpose each roller of the plurality of rollers is provided with a drive with a measuring device which is configured to measure a force exerted on the roller. When the passenger car sends braking signals to for instance the brake pads, the measuring device measures the forces exerted by the brake system and the brake system of the passenger car can be tested in this way. The tests on the brake system are thus performed optimally and increase the utility of the device.

The measuring device preferably comprises a force measuring device which measures a braking force exerted on the roller. Force measuring devices such as a load cell allow the braking force exerted on the roller to be measured accurately, in relatively versatile manner and cost-efficiently without the force measuring devices impeding the application of the vibrations in the first position.

The device preferably further comprises a frame which is configured to support the drive and wherein the force measuring device is provided between the frame and the drive. On one hand, the device provides in this way a robust suspension for the drive. On the other hand, the force measuring device measures the force exerted on the roller optimally. More specifically, the influence of further external factors, such as for instance clearance on the drive, is substantially avoided in this way. The force measuring device is further preferably arranged between the drive and the roller.

The drive is preferably an electric motor and the measuring device preferably comprises a current measuring device which measures a supply current to the electric motor. Although the current measuring device is more complex to integrate, the current measuring device has the advantage that the physical construction of the device is free from sensors. When the current measuring device is used in combination with a force measuring device, both types of measuring device can co-act in highly complementary manner in order to improve accuracy.

The device is preferably further provided with a communication interface which is configured to communicate with a vehicle control system of the passenger car on the device in order to control the brake system in a predetermined manner. In this way steering signals can be communicated to the device and the passenger car. In this way the tests performed on the device are performed with an improved co-action between the device and the passenger car. The device more preferably comprises a control device which is configured to detect a predetermined correlation between a braking action performed by the passenger car and a force measured by the measuring device. This makes it possible to give a measure of the extent to which the measured information is a correct representation and corresponds with the predetermined correlation. In other words, the device allows an accuracy of the tests to be determined in this way. The control device is more preferably further configured to compare, when detecting the predetermined correlation, the detected correlation to a steering signal which was sent to the brake system in the predetermined manner and a signal which indicates whether the detected correlation corresponds with the steering signal.

The plurality of rollers are preferably at least two rollers. The plurality of rollers are more preferably four rollers.

The plurality of rollers are preferably provided in pairs. A distance between rollers in pairs is more preferably adjustable.

The drive preferably comprises a control device which is configured to rotate the roller at a speed which corresponds at most to a driving speed of 50 hm/h.

The rollers are preferably provided at least partially with a coating.

The invention will now be further described on the basis of an exemplary embodiment shown in the drawing.

In the drawing:

FIG. 1 is a perspective view of a device according to an exemplary embodiment.

The following detailed description relates to determined specific embodiments. The teaching hereof can however be applied in different ways. The same or similar elements are designated in the drawings with the same reference numerals.

The present invention will be described with reference to specific embodiments. The invention is however not limited thereto, but solely by the claims.

As used here, the singular forms "a" and "the" comprise both the singular and plural references, unless clearly indicated otherwise by the context.

The terms "comprising", "comprises" and "composed of" as used here are synonymous with "including". The terms "comprising", "comprises" and "composed of" when referring to stated components, elements or method steps also comprise embodiments which "consist of" the components, elements or method steps.

The terms first, second, third and so on are further used in the description and in the claims to distinguish between similar elements and not necessarily to describe a sequential or chronological order, unless this is specified. It will be apparent that the thus used terms are mutually interchangeable under appropriate circumstances and that the embodiments of the invention described here can operate in an order other than described or illustrated here.

Reference in this specification to "one embodiment", "an embodiment", "some aspects", "an aspect" or "one aspect" means that a determined feature, structure or characteristic described with reference to the embodiment or aspect is included in at least one embodiment of the present invention. The manifestations of the sentences "in one embodiment", "in an embodiment", "some aspects", "an aspect" or "one aspect" in different places in this specification thus do not necessarily all refer to the same embodiment or aspects. As will be apparent to a skilled person in this field, the specific features, structures or characteristics can further be combined in any suitable manner in one or more embodiments or aspects. Although some embodiments or aspects described here comprise some but no other features which are included in other embodiments or aspects, combinations of features of different embodiments or aspects are further intended to fall within the context of the invention and to form different embodiments or aspects, as would be apparent to the skilled person. In the appended claims all features of the claimed embodiments or aspects can for instance be used in any combination.

FIG. 1 shows a perspective view of a device 100 for applying vibrations to a passenger car and for testing a brake system of the passenger car, according to an exemplary embodiment. A device configured exclusively to apply vibrations to a passenger car is typically utilized, when testing passenger car prototypes and/or when tuning and/or improving passenger cars that are in production, to test these cars for vibration. Such a device is known in practice as a so-called rattle machine. More specifically, the cars are placed on the rattle machine, wherein the passenger cars are located with at least two wheels, the front wheels and/or the rear wheels, on rollers. The rollers have a relief in order to generate a predetermined vibration when they turn under the wheels. A relief can for instance be created to imitate a predetermined ground surface, such as cobblestones. When the passenger car is placed with its wheels on the rollers, and the wheels and rollers rotate, a vibration is applied to the car by the surface relief. This vibration corresponds with a vibration of the passenger car when travelling along the predetermined ground surface.

A passenger car typically has a plurality of brake systems. In the context of the application testing of brake systems is more specifically understood to mean functional testing of the brake systems. In other words, the steering signals and a reaction to those steering signals are tested in particular.

Device 100, shown in FIG. 1, comprises a platform 110 on which the passenger car is placeable. The platform 110 is situated at a height in FIG. 1, for instance when platform 110 is supported by a frame. Platform 110 is preferably provided at the same height as a floor over which the passenger car can travel. This simplifies placing of the passenger car on the platform and speeds up a throughput time of the passenger car in the production line.

Platform 110 is provided with a plurality of rollers 120, 121, 122, 123. A respective wheel of the passenger car is positionable on each roller, for instance by driving the passenger car onto the platform and stopping it on the rollers. Four rollers are provided in the FIGURE. It will however be apparent that it is possible according to a preferred embodiment for only two rollers to be provided. A platform provided with two rollers provides a cost-efficient solution for applying vibrations and testing the brake system of the passenger car. In this way the device 100 can also have a more compact construction. The exemplary embodiment shown in FIG. 1 is provided with four rollers 120, 121, 122, 123. Such a preferred embodiment allows four wheels to be tested without moving the passenger car. Such a preferred embodiment further allows four wheels to be tested simultaneously, this further reducing the throughput time on the production line.

FIG. 1 further shows that rollers 120, 121, 122, 123 are more preferably provided in pairs, for instance a front pair of rollers 120, 121 and a rear pair of rollers 122, 123. The pairs of rollers are further preferably displaceable relative to each other. The rear pair of rollers 122, 123 can thus for instance be displaceable away from and toward the front pair of rollers 120, 121, or vice versa. This allows passenger cars with different axle spacing to be tested on the same device 100.

The rollers 120, 121, 122, 123 have for each wheel positioned thereon a first zone 130, 131, 132, 133 and a second zone 140, 141, 142, 143. The first zone 130, 131, 132, 133 is provided with a relief. The first zone 130, 131, 132, 133 is provided with the relief in order to generate a predetermined vibration when the rollers turn under the wheels. A relief can for instance be created to imitate a predetermined ground surface, such as cobblestones. When the passenger car is in a first position placed with its wheels on the first zone 130, 131, 132, 133 of the rollers, and the wheels and rollers rotate, a vibration is applied to the car by the relief of the first zone 130, 131, 132, 133. This vibration corresponds with a vibration of the passenger car when travelling along the predetermined ground surface.

The second zone 140, 141, 142, 143 is a relief-free zone. In other words, the second zone has no relief. When it is located on the device in the second position, the passenger car can be tested without vibrations. By providing each roller 120, 121, 122, 123 with the first zone 130, 131, 132, 133 with relief and the second zone 140, 141, 142, 143 without relief, the passenger car can first be placed on device 100 in order to test the passenger car on the relief, and the passenger car can then be moved to the second zone 140, 141, 142, 143 so as to be tested without relief. Lateral displacement of the vehicle on device 100 is simple when the rollers and the wheels are turning. This allows the vehicle to be tested for vibrations and without vibrations on one device. When the passenger car is placed on device 100 in the second position, this allows testing of the brake system, which is performed on a roller brake device in known production lines, to be performed on the device. In this way the tests need no longer be performed on a roller brake device, and a bottleneck in the production line is avoided.

More than two zones can further also be provided, for instance a third and a fourth zone. Each of the third and fourth zone can have a different relief. This allows the vehicle to be tested for different types of ground surface on one device. By varying the rotation speed of the rollers and selecting the relief of different zones a passenger car can be tested for different kinds, types and frequencies of vibration.

In order to test a brake system of the passenger car each roller 120, 121, 122, 123 of the plurality of rollers is provided with a drive 150 with a measuring device 160. The measuring device is configured to measure a force exerted on the roller. Only two drives 150 are shown in FIG. 1, although it will be apparent to the skilled person that each roller is respectively driven by a drive 150. As described above, the measuring device 160 is configured to measure a force, such as a braking force, exerted on the roller. When a braking instruction is sent during testing of the brake system, the part, which may or may not be the correct part, of the brake system will carry out the braking instruction and the performed braking action of the brake system can be detected. When the passenger car sends braking signals to for instance the brake pads, the measuring device measures the forces exerted by the brake system and the brake system of the passenger car can be tested in this way. The tests on the brake system are thus performed optimally and increase the utility of the device. The testing of passenger cars is thus performed more efficiently. Because the device is more widely applicable, production throughput time of a product line also remains the same. More specifically, more and different tests can be performed simultaneously.

The measuring device 160 is preferably a force measuring device which measures a braking force exerted on the roller. Force measuring devices such as a load cell allow the braking force exerted on the roller to be measured accurately, in relatively versatile manner and cost-efficiently without the force measuring devices impeding the application of the vibrations in the first position. According to a preferred embodiment, force measuring device 160 is provided between a frame, which frame is configured to support drive 150, and drive 150. On one hand, device 100 provides in this way a robust suspension for the drive 150. On the other hand, the force measuring device measures the force exerted on the roller optimally. The force measuring device is moreover also statically positioned. In other words, the force measuring device does not co-rotate with the shaft of the drive. This also simplifies the manner of connecting and the wiring running from and to the force measuring device. The force measuring device can alternatively or in combination be arranged between the drive 150 and the roller 120, 121, 122, 123.

According to a preferred embodiment, the drive 150 is an electric motor. Such electrically driven motors are controllable in simple manner and are widely available. A further advantage of the electric motor is that the measuring device can be a current measuring device which measures a supply current to the electric motor. Although the current measuring device is more complex to integrate, the current measuring device has the advantage that the physical construction of the device is free from sensors. When the current measuring device is used in combination with a force measuring device, both types of measuring device can co-act in highly complementary manner in order to improve accuracy. Drive 150 preferably comprises a control device which is configured to rotate the roller at a speed which corresponds at most to a driving speed of 50 km/h. According to an example, the roller can rotate at a speed of 45 km/h so that the vehicle can be tested for vibrations at such a speed. According to a further example, the roller can rotate at a speed corresponding to for instance 10 km/h to test the brake systems. Testing of the brake systems is preferably performed at a speed which corresponds at most to a driving speed of 10 km/h.

According to a preferred embodiment, device 100 is further provided with a communication interface (not shown) which is configured to communicate with a vehicle control system of the passenger car on the device in order to control the brake system in a predetermined manner. The steering signals to device 100 and the passenger car can be communicated in this way. In this way the tests performed on device 100, such as the vibration tests and brake system tests, are performed with an improved co-action between device 100 and the passenger car. Device 100 more preferably comprises a control device which is configured to detect a predetermined correlation between a braking action performed by the passenger car and a force measured by the measuring device. This makes it possible to give a measure of the extent to which the measured information is a correct representation and corresponds with the predetermined correlation. In other words, device 100 allows an accuracy of the tests to be determined in this way. The control device is more preferably further configured to compare, when detecting the predetermined correlation, the detected correlation to a steering signal which was sent to the brake system in the predetermined manner and a signal which indicates whether the detected correlation corresponds with the steering signal. When the control device for instance sends a steering signal intended to make a brake pad of the front left wheel of the passenger car brake and the brake pad of the rear right wheel performs a braking action, the control device indicates with a signal that the detected correlation is incorrect for the intended object of the steering signal. An operator can for instance deduce therefrom that the steering signal cabling is connected incorrectly. Such an error can then be corrected.

The skilled person will appreciate on the basis of the above description that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. A device for applying vibrations to a passenger car and for testing a brake system of the passenger car, which device has a platform on which the passenger car is placeable, wherein the platform is provided with a plurality of rollers wherein a respective wheel of the passenger car is positionable on each respective roller, wherein the plurality of rollers are respectively driven by a drive with a measuring device which is configured to measure a force exerted on the roller, wherein each roller has for each wheel positioned thereon a first zone provided with relief and a second, relief-free zone, so that in a first position on the device the passenger car is located with the wheels on the first zones and in a second position on the device is located with the wheels on the second zones, and so that in the first position vibrations are applied to the passenger car by the relief of the roller by rotation of the rollers under the wheels and so that in the second position the brake system of the passenger car can be tested by measuring a force exerted by the brake system with the measuring device wherein the first zone and the second zone are arranged adjacent to one another along an axial direction of the roller.

2. The device according to claim 1, wherein the measuring device comprises a force measuring device which measures a braking force exerted on the roller.

3. The device according to claim 2, further comprising a frame which is configured to support the drive and wherein the force measuring device is provided between the frame and the drive.

4. The device according to claim 2, wherein the force measuring device is arranged between the drive and the roller.

5. The device according to claim 1, wherein the drive is an electric motor and the measuring device comprises a current measuring device which measures a supply current to the electric motor.

6. The device according to claim 1, wherein the device is further provided with a communication interface which is configured to communicate with a vehicle control system of the passenger car on the device in order to control the brake system in a predetermined manner.

7. The device according to claim 6, further comprising a control device which is configured to detect a predetermined correlation between a braking action performed by the passenger car and a force measured by the measuring device.

8. The device according to claim 7, wherein the control device is further configured to compare, when detecting the predetermined correlation, the detected correlation to a steering signal which was sent to the brake system in the predetermined manner and a signal which indicates whether the detected correlation corresponds with the steering signal.

9. The device according to claim 1, wherein the plurality of rollers are four rollers.

10. The device according to claim 1, wherein the plurality of rollers are provided in pairs.

11. The device according to claim 10, wherein a distance between rollers in pairs is adjustable.

12. The device according to claim 1, wherein the drive comprises a control device which is configured to rotate the roller at a speed which corresponds at most to a driving speed of 50 km/h.

13. The device according to claim 1, wherein the rollers are provided at least partially with a coating.

* * * * *